US012662219B2

(12) United States Patent
Zanini

(10) Patent No.: US 12,662,219 B2
(45) Date of Patent: Jun. 23, 2026

(54) ASYMMETRIC CARGO BODY OF WATER NAVIGATION SYSTEM AND METHOD

(71) Applicant: COMBOYO ASYMMETRIC LOGISTC SOLUTIONS SERVICOS E PARTICIPACOES LTDA., Sao Paulo (BR)

(72) Inventor: Marco Zanini, Sao Paulo (BR)

(73) Assignee: COMBOYO ASYMMETRIC LOGISTC SOLUTIONS SERVICOS E PARTICIPACOES LTDA (BR)

( * ) Notice: Subject to any disclaimer, the term of this patent is extended or adjusted under 35 U.S.C. 154(b) by 22 days.

(21) Appl. No.: 18/772,600

(22) Filed: Jul. 15, 2024

(65) Prior Publication Data

US 2024/0367760 A1     Nov. 7, 2024

Related U.S. Application Data

(63) Continuation of application No. 17/694,073, filed on Mar. 14, 2022, now Pat. No. 12,065,221, which is a continuation of application No. PCT/US2020/049976, filed on Sep. 9, 2020.

(60) Provisional application No. 62/899,447, filed on Sep. 12, 2019.

(51) Int. Cl.
| | |
|---|---|
| *B63B 35/28* | (2006.01) |
| *B60L 8/00* | (2006.01) |
| *B63B 7/08* | (2020.01) |
| *B63B 22/04* | (2006.01) |
| *B63B 49/00* | (2006.01) |

(Continued)

(52) U.S. Cl.
CPC .............. *B63B 35/28* (2013.01); *B60L 8/003* (2013.01); *B63B 7/08* (2013.01); *B63B 22/04* (2013.01); *B63B 49/00* (2013.01); *B63H 21/17* (2013.01); *H02S 10/40* (2014.12); *B63H 2021/171* (2013.01)

(58) Field of Classification Search
CPC ........... B63B 35/28; B63B 7/08; B63B 22/04; B63B 49/00; H02S 10/40; B60L 8/003; B63H 21/17; B63H 2021/171
See application file for complete search history.

(56) References Cited

U.S. PATENT DOCUMENTS 2,055,369 A      9/1936  Warren
3,691,974 A  *   9/1972  Seiford, Sr. ............... B63B 3/08
                                                    14/27

(Continued)

FOREIGN PATENT DOCUMENTS

GB          2114624 A  *  8/1983  ............. E02D 29/06
WO     WO2009054022 A2    4/2009

OTHER PUBLICATIONS

Nick Savvides, River trains will lower costs on Europe's inland waterway operations, MaritimeNews, dated Jan. 24, 2019, 4 pages.

*Primary Examiner* — Stephen P Avila
(74) *Attorney, Agent, or Firm* — Manatt, Phelps & Phillips, LLP

(57) ABSTRACT

An autonomous cargo transporting system transports the cargo on a body of water using the natural current of the body of water to deliver cargo to a downstream port. The cargo system is asymmetric since cargo is delivered downstream using the current but the cargo system is disassembled (drastically reducing the weight) for a multimodal return trip back up the body of water.

19 Claims, 10 Drawing Sheets

(51) Int. Cl.
    B63H 21/17      (2006.01)
    H02S 10/40     (2014.01)

(56)         References Cited

U.S. PATENT DOCUMENTS

| 3,903,825 | A | * | 9/1975 | Hamy | B63B 21/62 |
|---|---|---|---|---|---|
| | | | | | 114/77 R |
| 6,354,235 | B1 | | 3/2002 | Davies | |
| 6,854,406 | B2 | | 2/2005 | Cardoza | |
| 2004/0237870 | A1 | | 12/2004 | Clark et al. | |
| 2011/0048311 | A1 | * | 3/2011 | Hosey | B63B 25/28 |
| | | | | | 114/344 |
| 2012/0295499 | A1 | | 11/2012 | Hine | |
| 2015/0203183 | A1 | | 7/2015 | Ambs | |
| 2016/0378107 | A1 | | 12/2016 | Morin et al. | |
| 2017/0291670 | A1 | | 10/2017 | Johnson | |

* cited by examiner

302

408

408

304

502

800

802

804

806

800

802

804

806

808

800

802

804

806

808

ASYMMETRIC CARGO BODY OF WATER NAVIGATION SYSTEM AND METHOD

PRIORITY CLAIMS/RELATED APPLICATIONS

This application claims priority under 35 USC 120 and 121 and is a continuation of U.S. patent application Ser. No. 17/694,073 filed Mar. 14, 2022 (now U.S. Pat. No. 12,065, 221 issued on Aug. 20, 2024) that is in turn a continuation and claimed priority under 35 USC 119(a)-(d) to PCT/ US2020/049976 filed Sep. 9, 2020 that in turns claims priority under the Paris Convention and 35 USC 119(e) to U.S. Provisional Patent Application Ser. No. 62/899,447, filed Sep. 12, 2019 and entitled "Asymmetric Body of Water Navigation System and Method", the entirety of all of which are incorporated herein by reference.

FIELD

The disclosure relates generally to a system and method for navigating a body of water that has a current and in particular to an autonomous inflatable raft system and method that is capable to asymmetrically navigating a body of water that has a current.

BACKGROUND

Transportation systems and method are well known that deliver cargo of various sorts from one location to another location, drop off the cargo and pick up different cargo that is then delivered back to the same origination point or to another destination. These cargo transportation system may include trains, trucks, ships and the like. All of these cargo transportation systems may be known as symmetric cargo transportation systems in which it is highly desirable to be able to unload the cargo at its destination and then load other cargo for the return leg of the trip or for a different destination.

However, these typical symmetric cargo transportation systems usually rely on being able to transport cargo to a destination once the initial cargo is delivered and thus would not be used for asymmetrical cargo transportation in which the cargo is delivered/transported in one direction, but there is not any cargo to pick up at the delivery point. Furthermore, these typical symmetric cargo transportation systems rely on the return cargo to make the costs of the symmetric cargo transportation systems reasonable.

There are situations in which it is advantageous and desirable to be able to efficiently and cost effectively perform asymmetric cargo transportation. For example, the country of Brazil is a net exporter of many commodities, mostly agricultural (liquid or bulk) and minerals ore. In Brazil, the commodities are produced mostly in North, Central and West Brazil which are areas with low population density and away from the populated coast and ports that make it easy to get the cargo to its market. In Brazil, for every 100 tons exported only 25 tons needs to be imported to those regions, mainly fuel, fertilizers and construction material. This results in a need in Brazil for the asymmetric cargo transportation system and method in which the commodities can be transported on a river from the production areas and then the cargo transportation system can be disassembled and brought back up to the production areas. Brazil also has the second largest network of navigable rivers in the world (44.000 km) of which a fraction is used today and only by symmetric systems. This network of navigable rivers in Brazil can be used for the asymmetric cargo transportation. The navigable bodies of water in other countries also may be used for the asymmetric cargo transportation.

Today, the solution to the asymmetric cargo transportation challenge is not satisfactorily solved. From a cargo transportation operator's perspective, the operator sums the return cargo value to the total freight value. In other solutions, the operator may try to minimize with the return of other goods which is not a solution when it comes to the flow of commodities or minerals, due to the high volume, being only viable in places where the origin of freight and shipping has high demand. None of these above solutions actually address the issues raised by asymmetric cargo transportation.

Furthermore, today, waterway logistics operations are not exploited to their full capacity in locations with cargo asymmetry on account of the asymmetry itself, no other system follows the principle of aggressively eliminating the cost of return by deflating and demounting the system for the return trip against current. Thus, it is desirable to provide an asymmetric cargo transportation system and method and it is to this end that the disclosure is directed.

DETAILED DESCRIPTION OF ONE OR MORE EMBODIMENTS

The disclosure is particularly applicable to an autonomous inflatable raft system for asymmetrical cargo transportation that is capable of navigating a river that has a current and it is this context that system and method are described. In one embodiment, the system may transport cargo down the river in the direction of the current in the river. However, the disclosed system and method can be used to transport cargo in one embodiment on other bodies of water that may have a current in which the cargo is transported in the direction of the current. For example, the system and method may be used for fresh water, saline or brackish bodies of water that have a current. Although Brazil is provided as an example of a country/region in which an asymmetric cargo transportation system and method is desirable, the asymmetric cargo transportation system and method may be used in any country or region that has navigable rivers or waterways that may be fresh water, brackish water of seawater.

Figure 1:
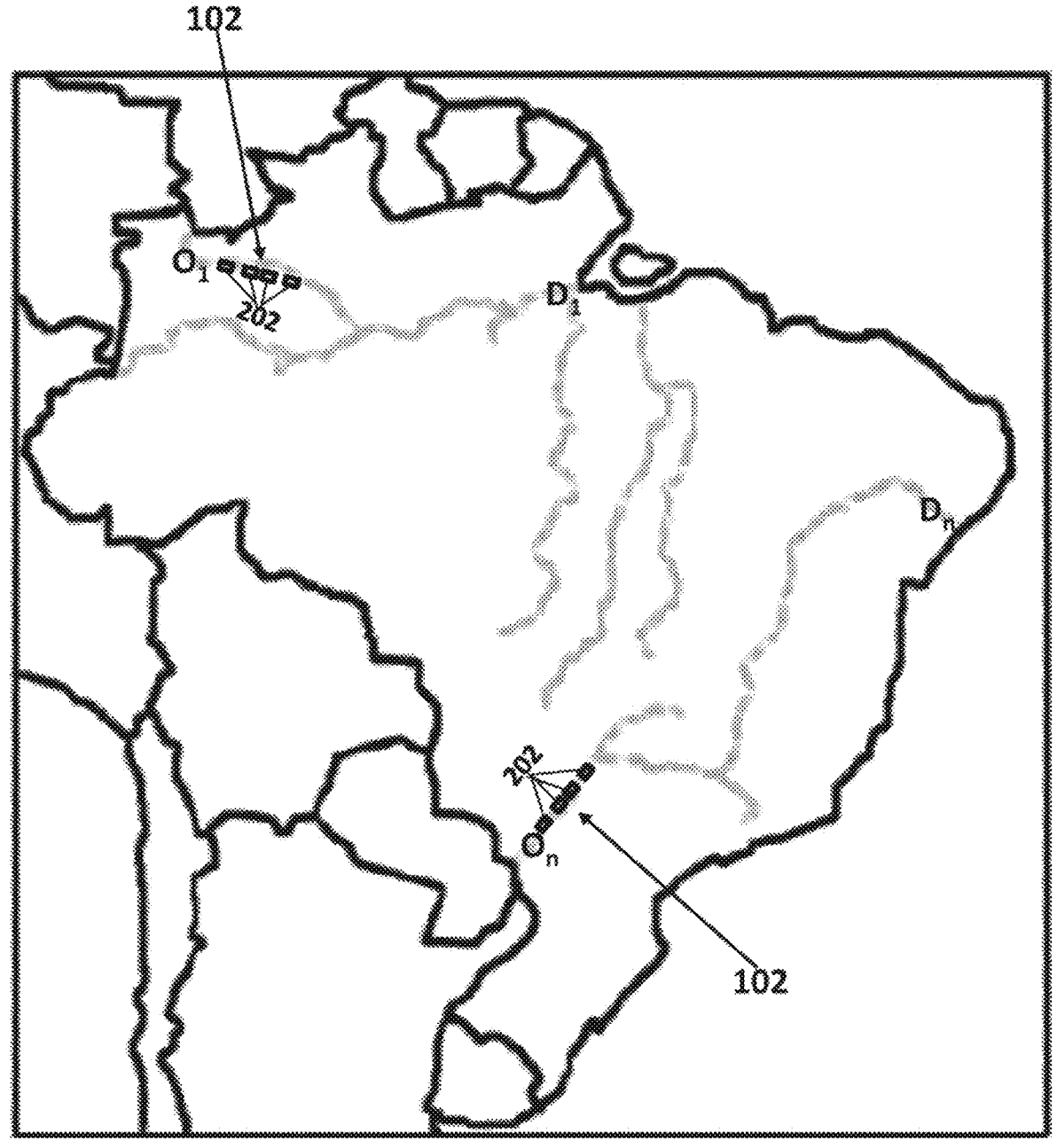
FIG. 1 illustrates navigable waterways in a country in which asymmetric cargo transportation may be used.

An asymmetric cargo transportation system that can be used for the navigable waterways may be used mostly for export goods (from the origin points $O_1, \ldots, On$ in FIG. 1 to the destination points $D_1, \ldots, Dn$ in FIG. 1) to deliver the goods/commodities, etc. for export down the navigable waterways. The asymmetric cargo transportation system may float on and ride the navigable waterway currents down the navigable waterway from the origin to the destination as shown in FIG. 1 thus transporting the cargo to destination from which the cargo can be loaded onto more traditional transportation like ships or airplanes. Once the cargo has been delivered to the destination, the cargo carriers that make up the asymmetric cargo transportation system may be deflated (in the example in which each carrier is an inflatable raft) and transported (via various methods including an airplane since the overall weight of the system being transported back upstream is about 2% of the cargo (in weight and volume) transported down the navigable waterway. When the asymmetric cargo transportation system arrives back at an origin point, each carrier may be re-inflated with pressurized air (to achieve buoyancy in the navigable waterway and refilled with cargo so that the asymmetric cargo transportation system may be reused many times.

The solution disclosed herein reduces the country overall asymmetry as the empty convoy return leg represents an additional cargo, albeit small, for the symmetric solutions, that will grow with the success of the system and could eventually close the gap if the offer of traditional symmetric system is not increased further but rather saturated in its return capacity. By riding the navigable waterway current to the destination, there is no need of large propulsion systems or energy to power those propulsion systems. However, the asymmetric cargo transportation system generates a small amount of energy (via solar energy in one embodiment) that may be used for autonomous navigation control systems and computers and by electric motors to keep the convoy en route counteracting the centrifugal forces in the curves of the navigable waterway. Furthermore, the asymmetric cargo transportation system is autonomous meaning that the convoy does not have a crew and uses computer systems and artificial intelligence and machine learning ("AI") to detect and avoid problematic obstacles in the navigable waterway. In one implementation, the convoy has a processor and memory (situated in one or more of the carriers in a watertight portion) and a plurality of lines of instructions (or a hardware device) so that the hardware device or processor (when it executes the plurality of instructions) is configured to perform the machine learning/AI processes to determine the navigation of the convoy and adjust the position of the convoy in the navigable waterway based on the set of sensors and stored information about the navigable waterway. These elements of the navigation system are powered by the solar energy devices that are part of the convoy.

In one embodiment, the AI has control laws that perform the navigation of the convoy over the navigable waterway (sometimes referred to as autopilot). The autopilot may have a plurality of control laws (developed using control law logic) that handle the various navigation tasks for each convoy on each navigable waterway. The control laws and logic operate to provide the autonomous navigation of each convoy on the particular navigable waterway in which the navigation system responds like a swarm but with a distinct and new feature as the pieces are connected with the inner buoys or nodes used to move across the current course and the bow and stern buoys also having directional acceleration aspect and braking aspects. These responses are quantified by matching novel and existing mathematical prediction filters that are loaded with data from the sensors (GPS, SONAR, LIDAR, CAMERAS, Anemometers, etc. as described above) and data from the database of the system that may include data about the particular navigable waterway.

The navigation system may use ground based filters. In statistical and control theory, Kalman filtering, also known as linear quadratic estimation (LQE), is an algorithm that uses a series of measurements over time, containing statistical noise and other inaccuracies, and yields variable estimates. Unknowns that tend to be more accurate than those based only on a single measurement, estimating a joint probability distribution over the variables for each time period. The filter is named after Rudolf E. Kalman, one of the leading developers of his theory. Using a Kalman filter does not assume that errors are Gaussian. However, the filter produces the exact conditional probability estimate in the special case that all errors are Gaussian. Extensions and generalizations for the method have also been developed, such as the extended Kalman filter and the odorless Kalman filter, which work in nonlinear systems. The underlying model is similar to a hidden Markov model, except that the state space of latent variables is continuous and all latent and observed variables have Gaussian distributions.

FIG. 1 illustrates navigable waterways in a country in which an asymmetric cargo transportation system 100 may be used. The example in FIG. 1 is Brazil, but the system 100 may be used in various countries. The asymmetric cargo transportation system 100 may have a plurality of convoys wherein each convoy 102 may be used to navigate down the navigable waterway based on the current from an origin point ($O_1, \ldots, On$) to a destination point ($D_1, \ldots, Dn$). Each convoy 102 may be a plurality of carriers 202 that each float and navigate the navigable waterway as described below in more detail and then be transported back to an origin point to be reused. In one embodiment, each carrier 202 may be a barge. The number of carriers/barges 202 in each convoy 102 may vary between a few carriers and up to forth or more carriers with the only condition that a bow carrier and a stern carrier may be equipped with three navigation buoys each. The three navigation buoys may include one navigation buoy that acts on the axis of the convoy (and moves the convoy along the axis of the convoy, such as a longitudinal axis of the convoy and each carrier) and two navigation buoys angled 45 degrees port and starboard as described below in more detail.

Figure 2:
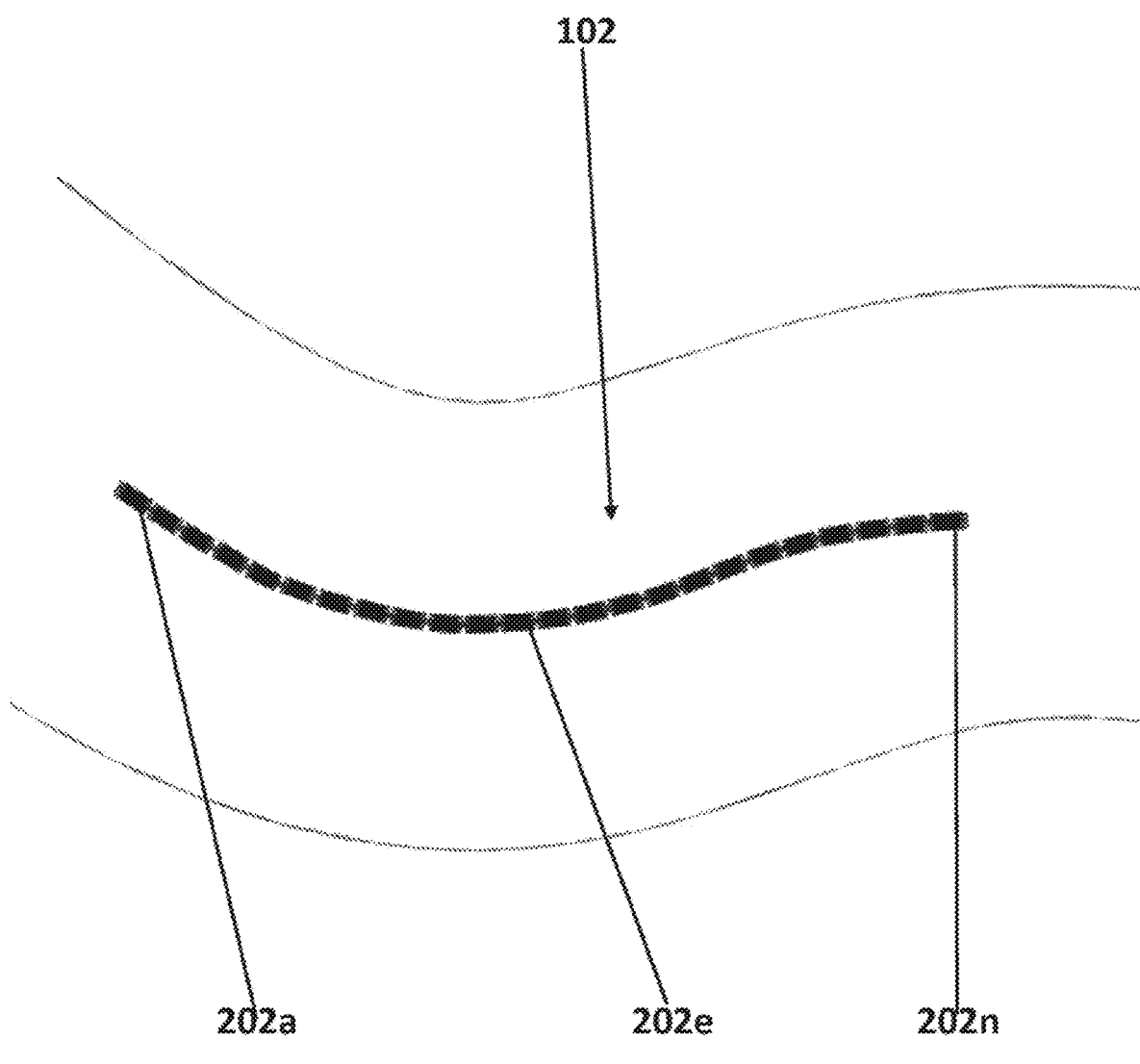
FIG. 2 is a top view of an asymmetric cargo transportation system that can be used on the navigable waterways in FIG. 1.

FIG. 2 is a top view of an asymmetric cargo transportation system convoy 102 that can be used on the navigable waterways in FIG. 1. As shown in FIG. 2, each convoy 102 may have a plurality of carriers 202 wherein each carrier may be, in one embodiment, an inflatable raft that carries cargo. In some embodiments, each carrier 202 may be a different size or shape for carrying a particular type of cargo as described below. Thus, the convoy 102 may be modular, self-contained and composed of a variable number of identical carriers/barges 202 (identical for a given type of cargo: bulk or liquid and mass) and the cargo is actually transported in a detached container, made of the same flexible textile as the barge, matching exactly the hull geometry.

Each convoy 102 may have a first/bow carrier 202a, a number of middle carriers 202e and an end/stern carrier 202n as shown in FIG. 2 in the convoy that travels with the current of the navigable waterway. Each carrier 202 may be connected to each other carrier securely but flexibly. Thus, each carrier 202 is securely connected to each other carrier, but each carrier may move and rotate relative to the other carriers as shown in FIG. 2 as the convoy 102 navigates the current of the navigable waterway. In one embodiment, each carrier/barge 202 may be joined to another carrier/barge by special cables that passes thru an independent floating buoy that contains an electric motor with a tunnel propeller, the batteries, the battery charger and communication and control. The independent floating buoy acts as a very loose hinge capable of absorbing all kinds of natural movements of the two carriers/barges it connects.

Each convoy 102 may further include one or more navigation buoys (described in more detail below) that can be used to adjust the position of each carrier and the convoy as it is navigating down the navigable waterway. The convoy 102 may further comprises a plurality of solar cells (on a cover of each carrier in one embodiment or at other locations) so that the convoy can generate electricity that is used to power the navigation system and computer of the convoy and used to power the one or more motors in each navigation buoys so that each convoy does not pollute the navigable waterway while transporting the cargo down the navigable waterway.

Each convoy 102 also may be equipped with navigational lights, forward looking infrared cameras and projectors, fog horn, an underwater sonar that detects the changes of the river bottom that has occurred since the passage of the previous convoy and possibly lidar. All of the above may be linked via satellite to a central monitoring station with regular convoy dirigibility and obstacles avoidance being executed/performed with the use of artificial intelligence (AI) on board tools on the convoy 102 and a backup solution that can override the on-board system remotely from the central monitor station. The system and method may further have an emergency stop solution by remotely dropping gravity anchors from a smaller separated barge at the stern of the convoy.

Since the convoy 102 moves at a speed roughly equivalent to the navigable waterway current, there is no risk of hitting other items that also run the current as the relative speed between the convoy 102 and the other items is about zero. Furthermore, fixed obstacles both above and below the surface of the navigable waterway are mapped in advance and their positions are checked with each new convoy run on the same route. Mobile obstacles in the navigable waterway can be detected by the convoy 102 while traveling the navigable waterway avoided in advance using sensors and AI. All of the obstacles (including other boats, etc.) can be easily avoided due to the clearly visible low speed convoy visible from far away and with ample warning, day and night.

Figure 3:
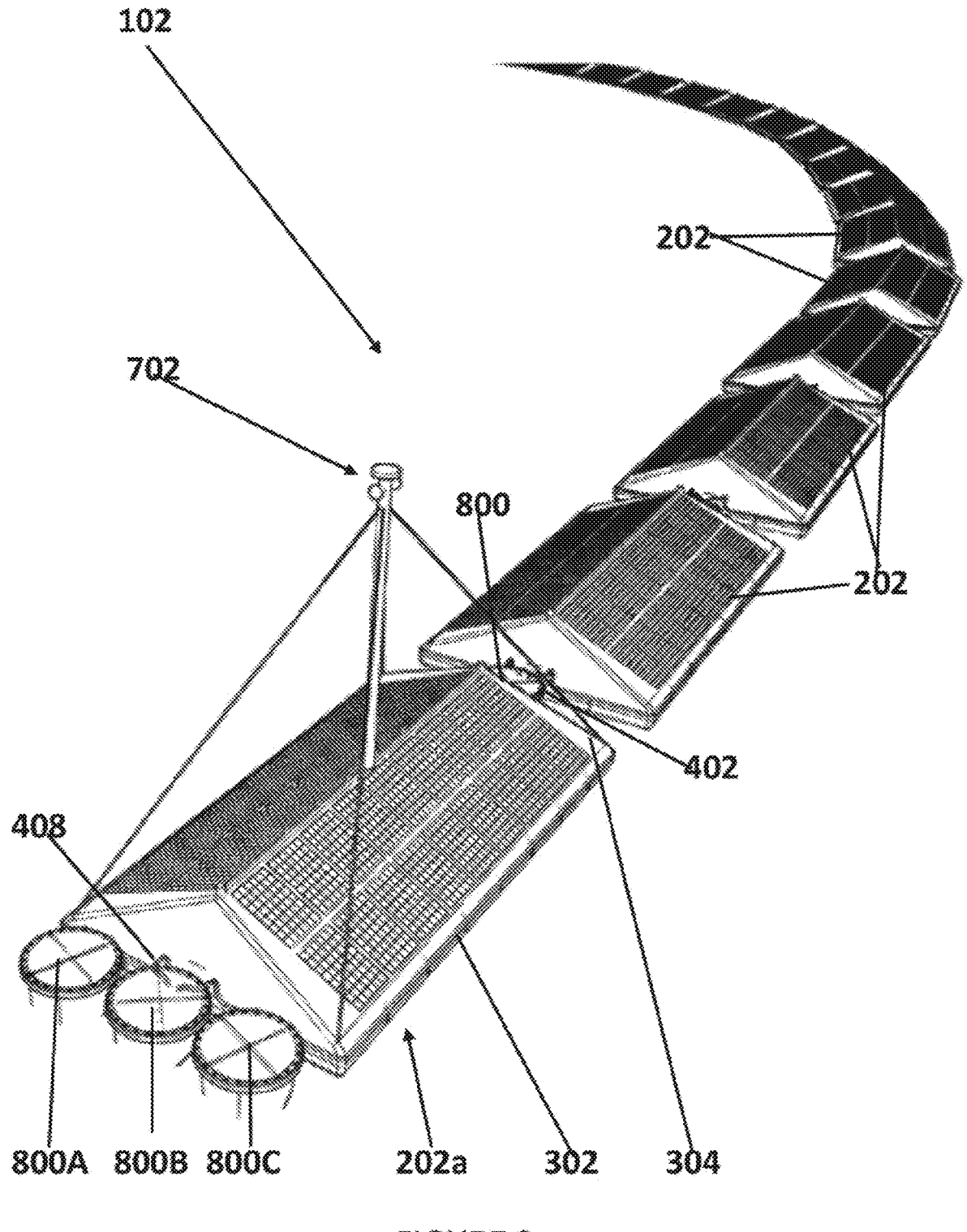
FIG. 3 is a perspective view of the asymmetric cargo transportation system.

FIG. 3 is a perspective view of the asymmetric cargo transportation system and the convoy 102 with the plurality of carriers 202. For purposes of illustration, the bow/first carrier 202a is described in more detail. As shown in FIG. 3, each carrier 202 may have a bottom portion 302 that floats in the navigable waterway and a cover portion 304 that rests or is connected to the bottom portion 302 described in more detail with reference to FIGS. 4-5. The cover portion 304 may protect the cargo from the elements during the transportation of the cargo and prevent the cargo from being slipped from the carrier/barge during any rough water/storm, etc.

In one embodiment, the bottom portion 302 of each carrier 202, that may be an inflatable raft, is composed of a underwater hull that will receive a cargo container with the same exact geometry and a perimeter tubular inflatable portion, rectangular in plan, that provides the added buoyancy, raises over the water level, protects cargo from waves and sprays, protects from collisions and acts as pusher on the hinge floating buoy. The tubular inflatable portion may be subdivided into a plurality of independent air tight compartments to assure safety of operation even with several compartments punctured and unable to provide buoyancy.

Figure 4:
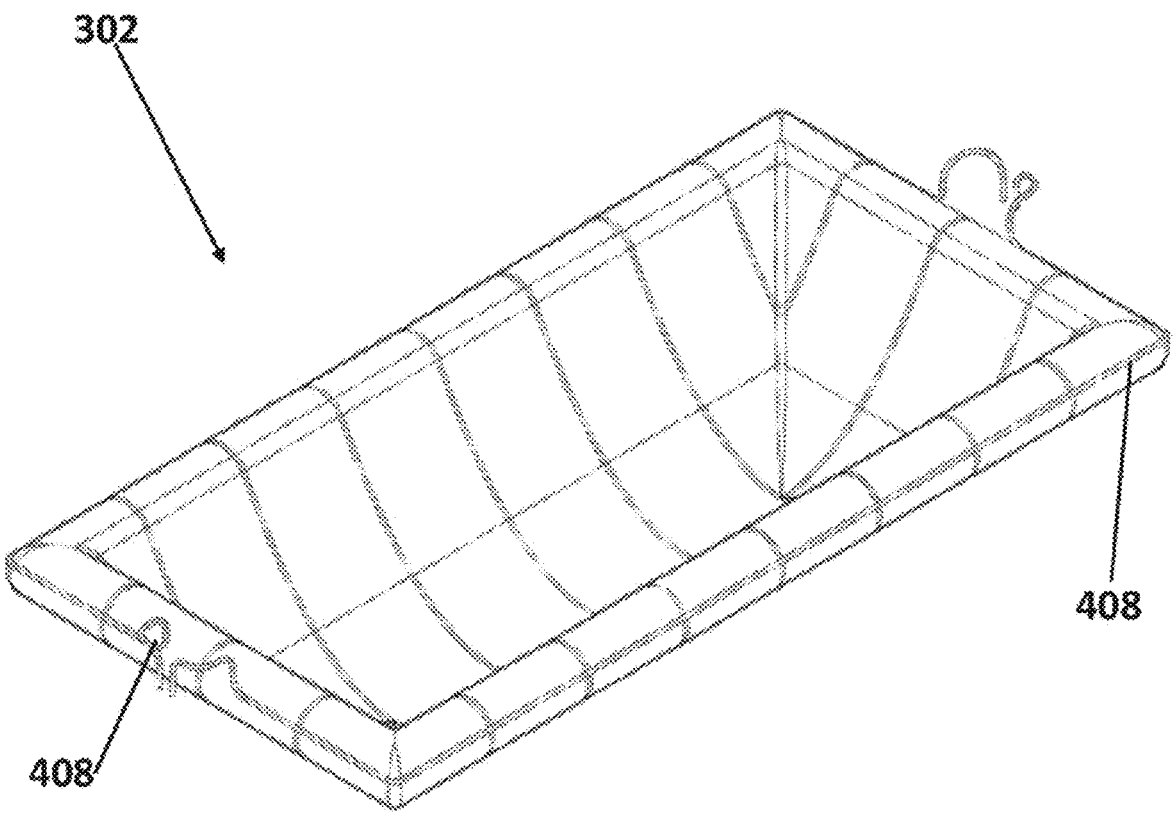
FIG. 4 illustrates more details of an example of the bottom portion of each carrier/barge of the asymmetric cargo transportation system.

As shown in FIG. 4, each bottom portion 302 of each carrier 202 may have an inflatable portion. The inflatable portion may have a particular size and shape to house each type of cargo and support the weight of the cargo so that the bottom portion 302 floats on the navigable waterway at an appropriate height above the level of the navigable waterway. For example, a heavier cargo, like ore, will require an inflatable portion that has more floatation. Each carrier 202 may also have a set of electrical cables 408 that routes electrical power from the solar cells on each carrier (shown in FIG. 5) to the motors that are in the buoys 800 as described below.

Figure 5:
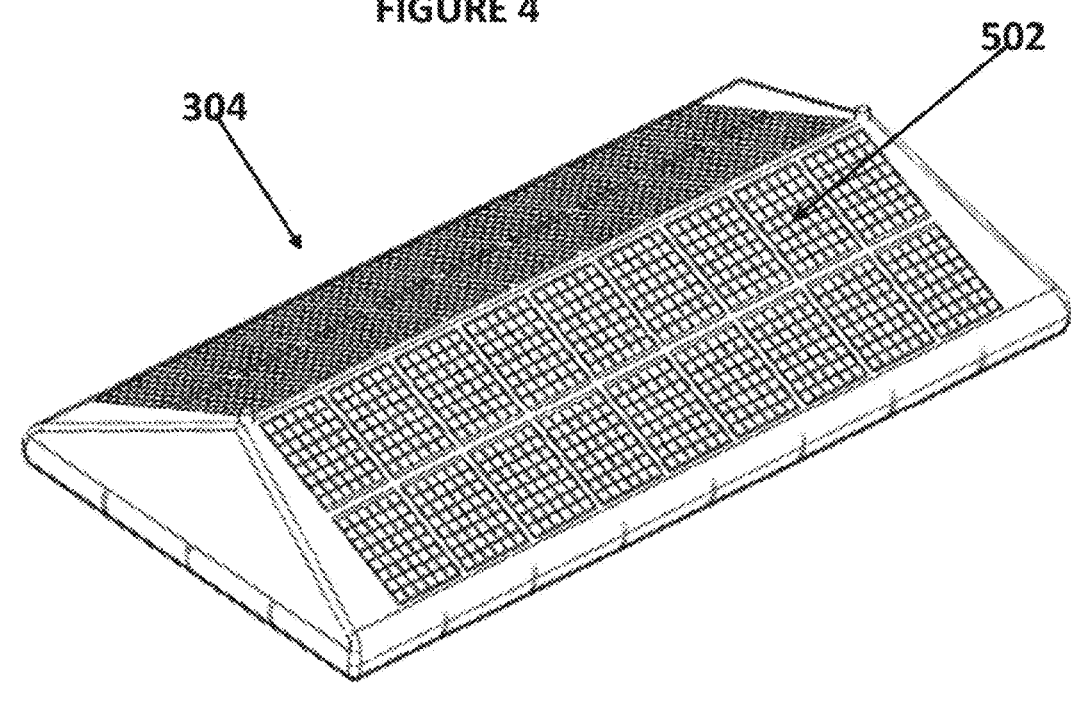
FIG. 5 illustrates more details of an example of the cover portion of each carrier/barge of the asymmetric cargo transportation system.
Figure 6:
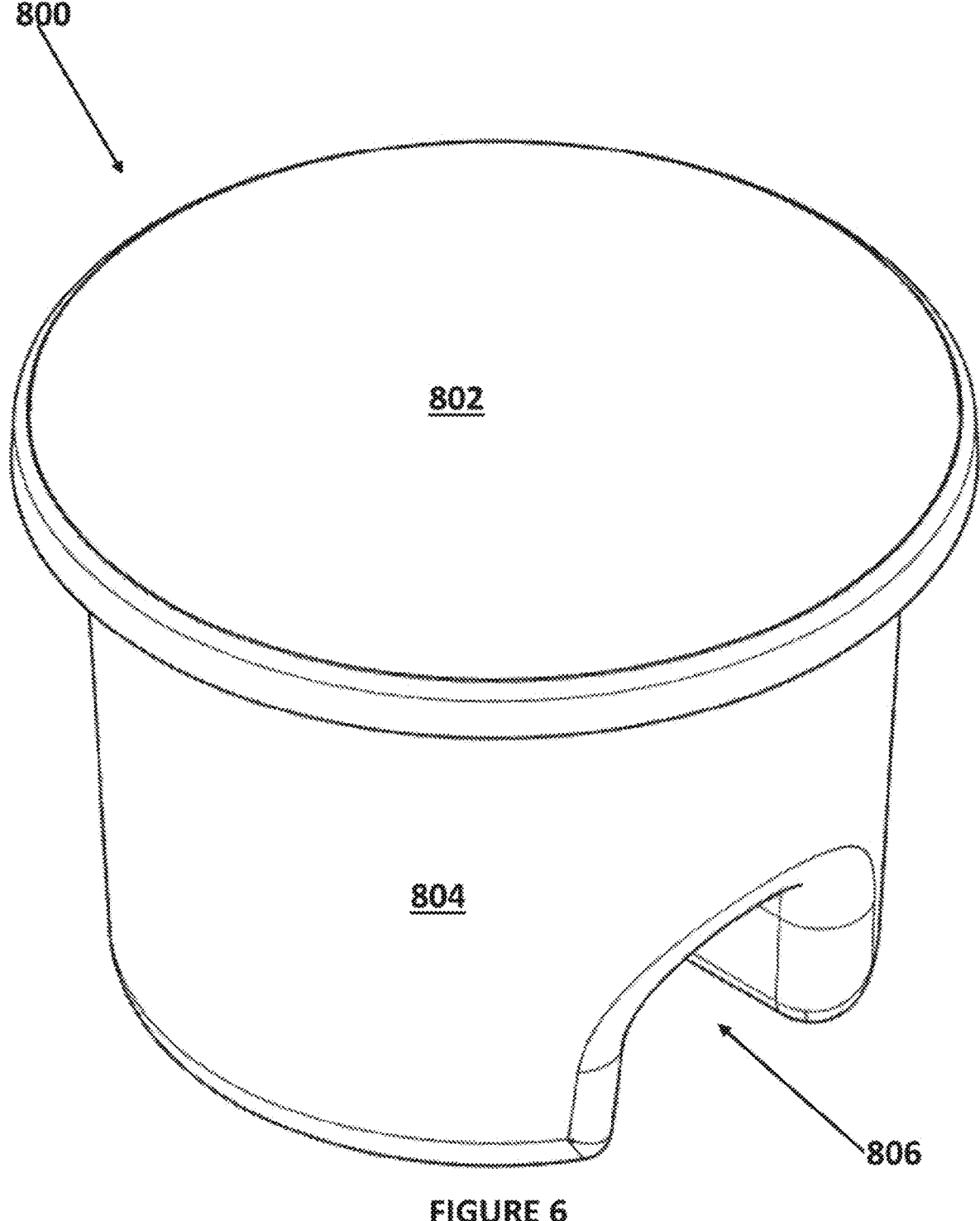
FIGS. 6-10 are a top perspective view, a bottom perspective view, a side view and two cut-away views of an embodiment of the navigation buoy of the asymmetric cargo transportation system.
Figure 7:
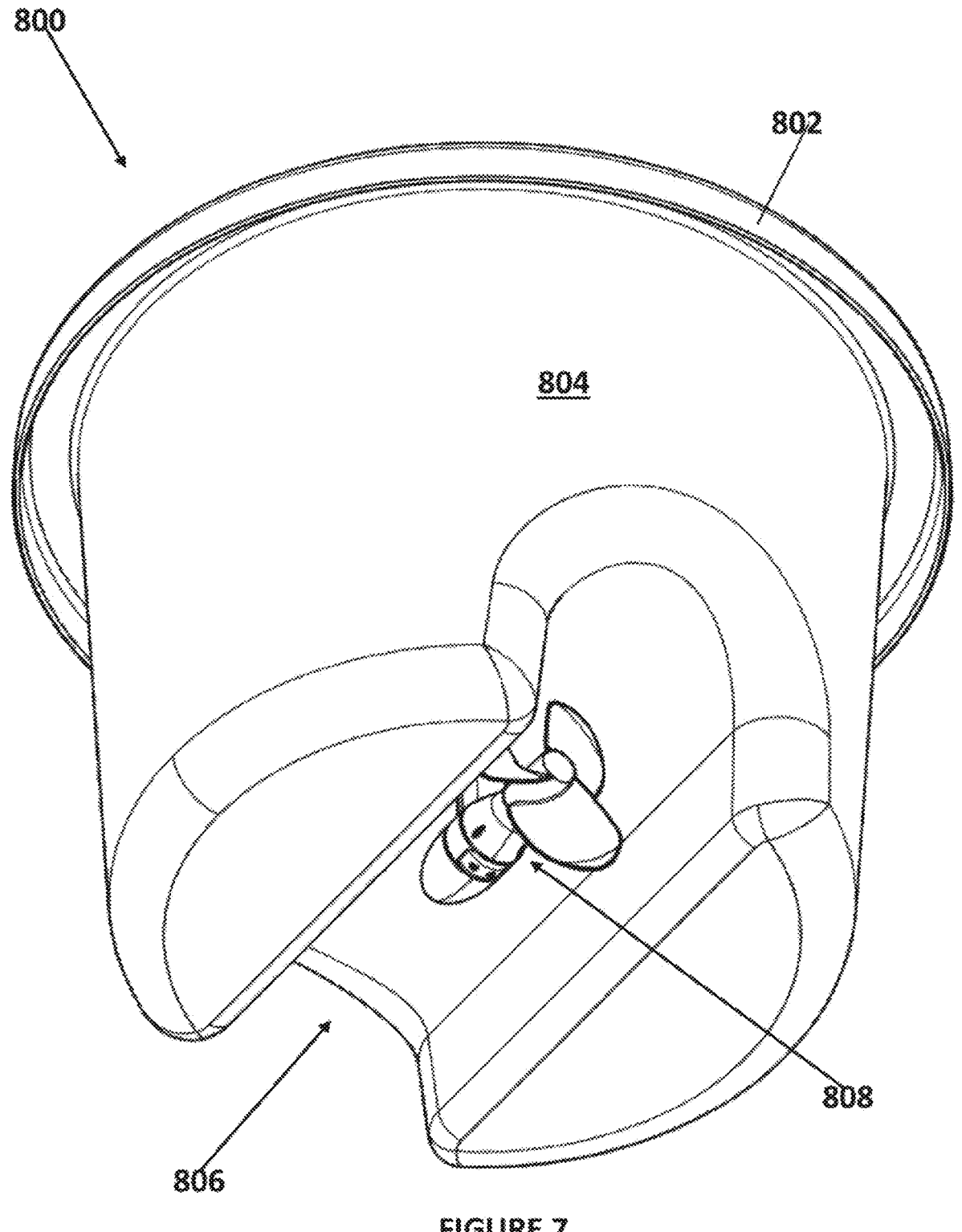
Figure 8:
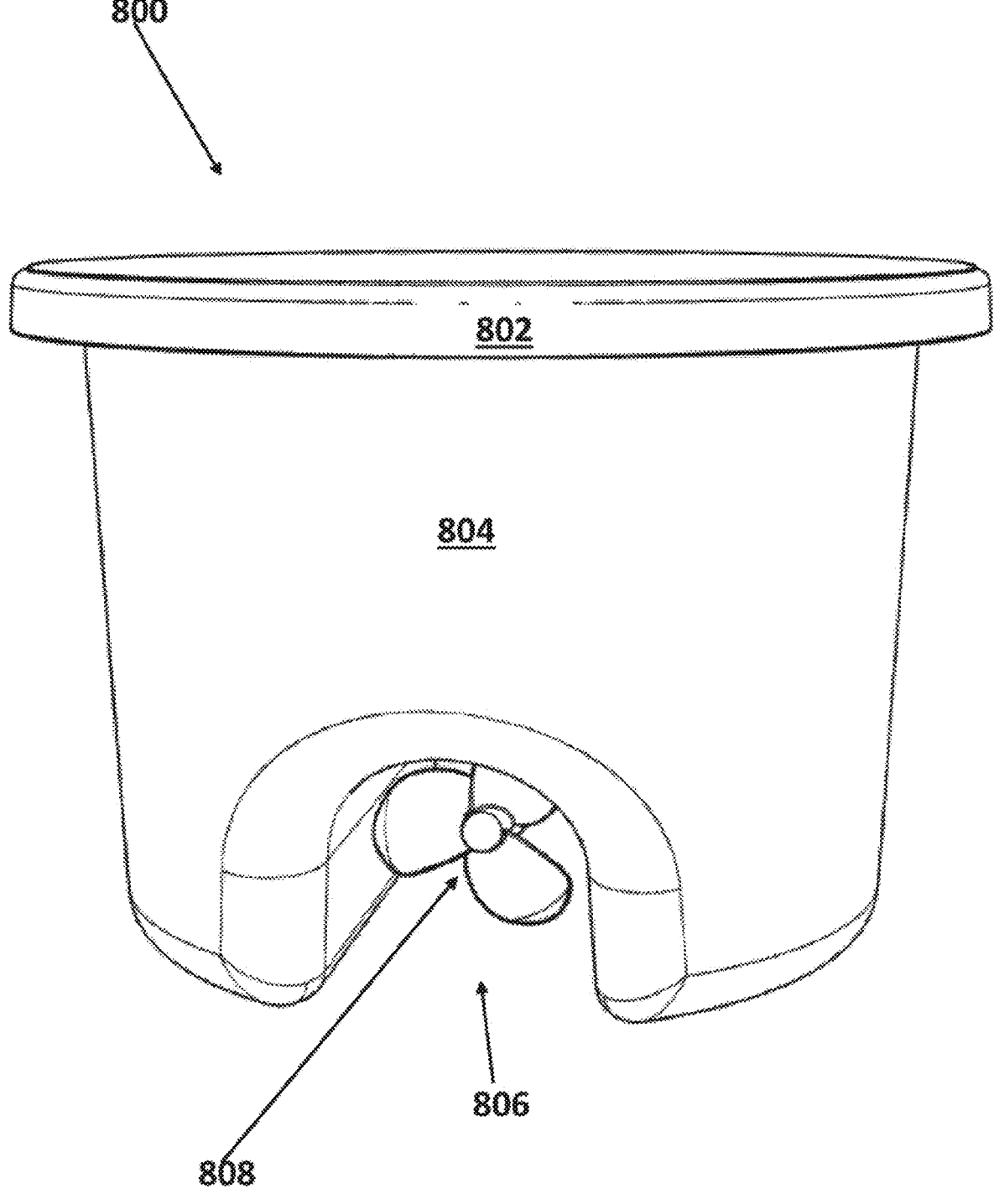

The set of electrical cables 408 may have a plug at one end as shown in FIG. 4B that may be connected to a set of solar cells/panels 502 that may be on the cover portion 304 as shown in FIG. 5 of each carrier that generates the electrical power for the motors and other electrical systems of the convoy 102. As described above, the cargo needs to be covered and protected from atmospheric events during navigation. In the example shown in FIG. 5, the cover portion 304 may be a waterproof two sided roof that supports waterproof flexible photovoltaic solar panels 502 in bags of clear plastic netting that generate the energy that is stored in batteries for use during the night navigations, batteries as well as battery charger are housed in the floating buoy, a self-contained unit that can be separated from the barge.

Returning to FIG. 3, each of the bow carrier 202A (as shown in FIG. 3) and the stern carrier (not shown in FIG. 3) may have a plurality of buoys 800, such as the three buoys 800A, 800B, 800C, connected to the end of the convoy 102. Each of the other carriers 202 may have a single buoy 800 attached to it as shown in FIG. 3. The buoys 800 may be connected to the carrier by an attachment mechanism 402. Each of the buoys 800 is described below and provides thrust along an axis (in a thrust direction) using a motor as shown in FIGS. 6-10 and is connected to the carrier by the set of electrical cables 408. For the bow and stern carriers 202A, 202n, the three buoys 800A, 800B, 800C together provide thrust along each axes of motion since each buoy is oriented in line with a different axis. Thus, the navigation system can control the three buoys 800A, 800B, 800C to adjust the position of the bow or stern carrier. Each of the bow and stern carrier may also have a mast 702 that has a number of sensor atop the mast as well as wireless communications circuits.

FIGS. 6-10 are a top perspective view, a bottom perspective view, a side view and cutaway views of an embodiment of a navigation buoy 800 of the asymmetric cargo transportation system that may be connected to each carrier 202 to adjust the convoy 102 during its navigation down the navigable waterway. Each of the buoys 800 is identical in shape and size (an example of which is shown in FIGS. 6-10), but each buoy's housing accepts more or less batteries so that, for example, an increase in the batteries may be required on the buoy 800 for barges/carriers 202 with a higher mass cargo. Each buoy 800 may have a top cover 803 and a body portion 804 that can be connected in a water-tight manner to house various elements described below.

In the example in FIGS. 6-10, the buoy 800 that provides thrust along a single axis are shown. Each buoy 800 may have a tunnel 806 at the bottom of the buoy 800 with a motor 808 with a ducted propeller as shown in FIGS. 6-10 (also known as a Kort nozzle) that is a marine propeller fitted with a non-rotating nozzle that improves the efficiency of the propeller and is especially used on heavily loaded propellers or propellers with limited diameter.

Figure 9:
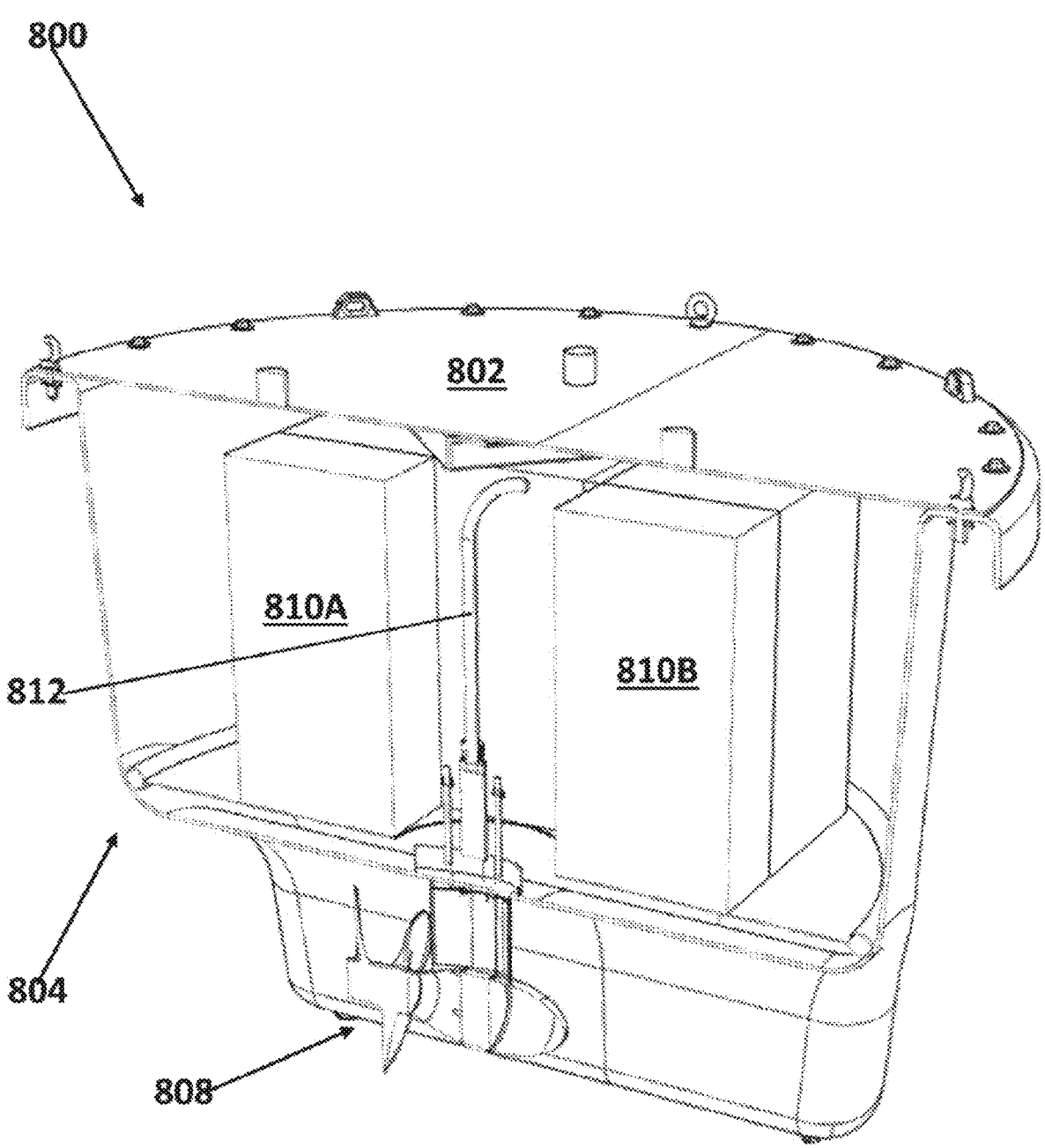
Figure 10:
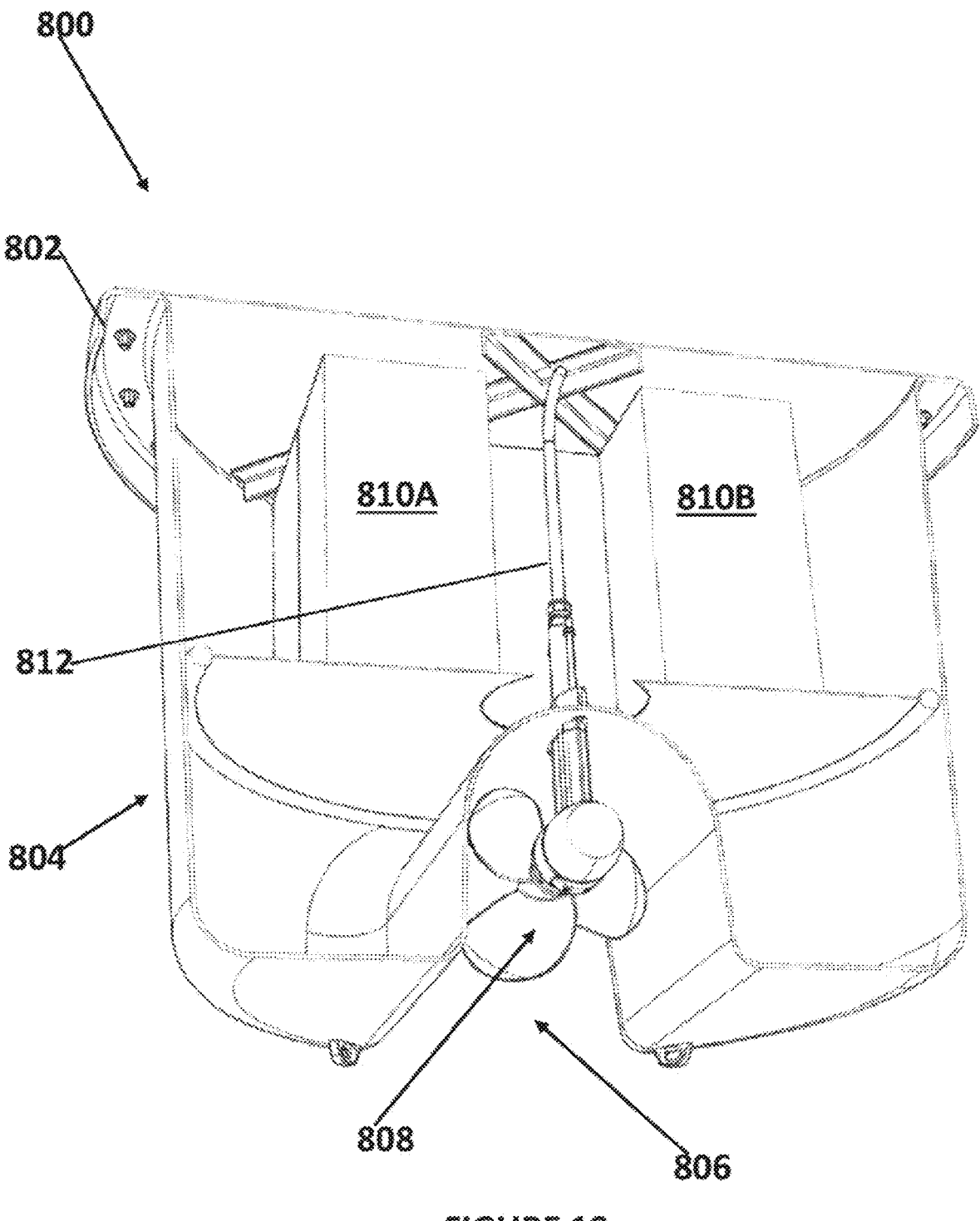
Figure 11:
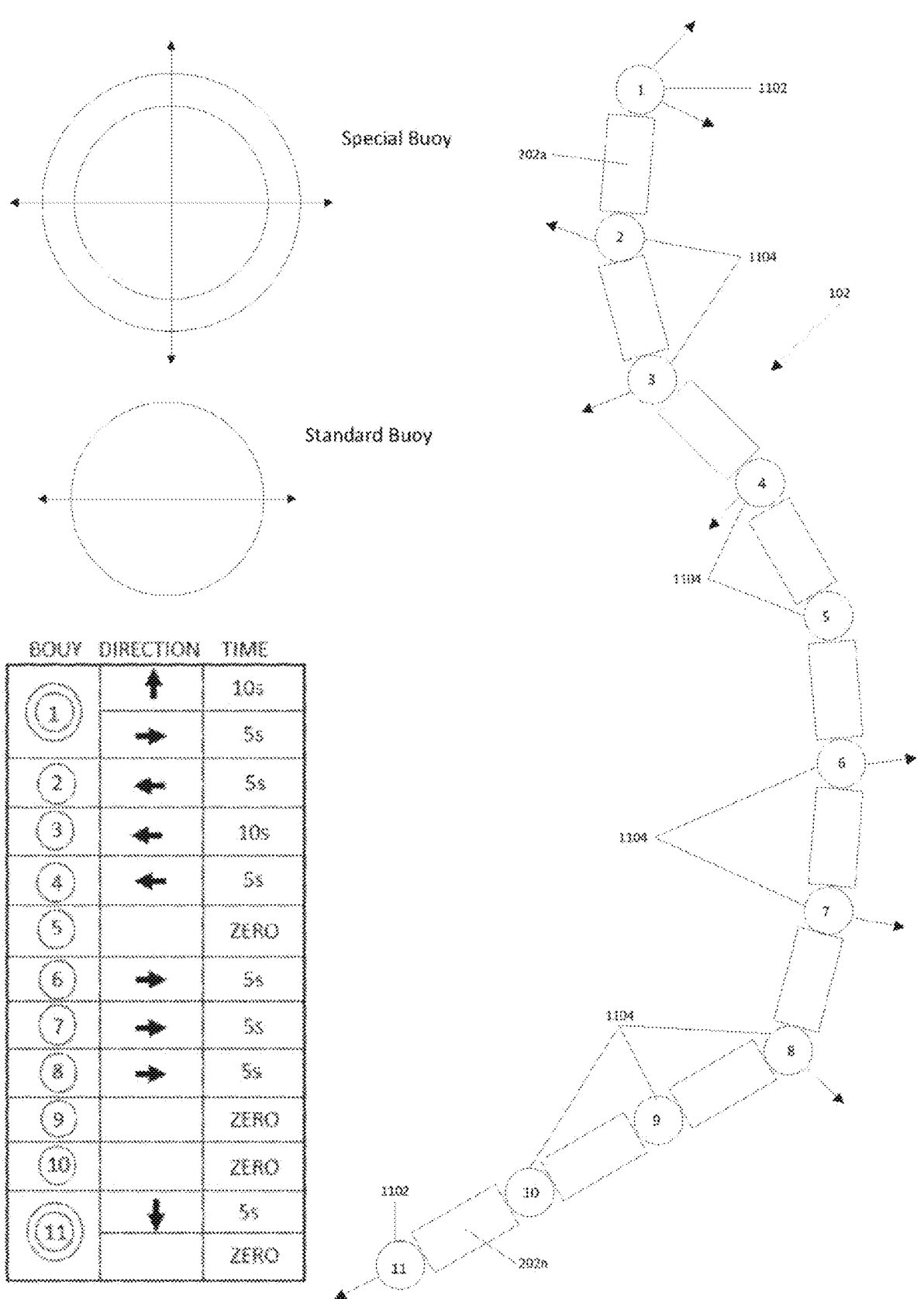
FIG. 11 illustrates an example of the navigation method of the asymmetric cargo transportation system.

As shown in FIGS. 9-10, each buoy 800 within the water-tight body portion 804 has one or more batteries 810A, 810B that has an electrical cable 812 that connects the batteries to the motor 808. Each buoy may also have other circuitry, such as a processor, etc. that receives data/instructions/commands from the navigation system to control the operation of the motor as shown in FIG. 11. The one or more batteries 810A, 810B may store energy to operate the motor and may receive power from the solar cells/panels. Each buoy 800 also may have buoyant materials (in addition to air inside the body portion 804) so that the buoy floats in the navigable waterway.

The asymmetric cargo transportation system may implement a navigation method for the navigable waterway. In the method, the route on the navigable waterway, such as a river, may be scouted in advance in order to discover the differences in speed in the current in different sections of the navigable waterway, discover hidden obstacles, especially underwater ones and sandbanks that may represent a problem, etc. Once the scouting of the navigable waterway is performed, an ideal route down the navigable waterway may be mapped with waypoints so that the autopilot of the convoy 102 may follow the waypoints correcting the navigation (an example of which is shown in FIG. 11) according to parameters and algorithms that are proprietary, basically activating the motors to apply forces mostly at 90 degrees with the route.

In an alternative embodiment, the bow and stern carriers may instead have a single special buoy attached to it and the single buoy has two motors orthogonal to each other (at 90 degrees) so that the single buoy can thus provide the thrust along each of the different axes of motion as described above and as shown in FIG. 11.

FIG. 11 illustrates an example of the navigation method of the asymmetric cargo transportation system. In the example in FIG. 11, the convoy 102 may have the special buoy 1102 at each end of the convoy (adjacent the bow carrier 202*a* and adjacent the stern carrier 202*n*) and a standard buoy 1104 in between each other carrier 202 that is part of the convoy 102. FIG. 11 shows how the navigation method, for a particular portion of a navigable waterway, activates each buoy 1102, 1104 in a particular direction and for a particular time to adjust the position of the convoy 102 in the navigable waterway.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.)

to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. An asymmetric cargo transporting system on a navigable waterway, comprising:
    a plurality of carriers connected to each other and each carrier floats on the navigable waterway and is capable of carrying cargo, wherein the plurality of carriers navigate downstream on the navigable waterway using a current of the navigable waterway;
    at least one carrier having a navigation system that has a set of navigation sensors that each gather information about the navigable waterway, a processor, a memory and a plurality of instructions that are executed by the processor so that the processor is configured to perform navigation, using artificial intelligence, of the plurality of carriers in response to the gathered information about the navigable waterway; and
    wherein the cargo is delivered in one direction downstream and the plurality of carriers are disassembled and returned upstream.

2. The system of claim 1 further comprising a solar energy device connected to one or more of the plurality of carriers that generates electrical energy and the navigation system is powered by the solar energy device and connected to one or more of the carriers and, autonomously navigates the navigable waterway.

3. The system of claim 1, wherein the plurality of carriers further comprises a bow carrier, a stern carrier and at least one carrier between the bow and stern carriers.

4. The system of claim 3, wherein the navigation system further comprises two or more buoys attached to the bow carrier and two or more buoys attached the stern carrier that provide thrust to adjust the position of the plurality of carriers in the navigable waterway.

5. The system of claim 4, wherein the two or more buoys further comprises a first buoy having a motor with a thrust direction along a longitudinal axis of the plurality of carriers, a second buoy having a motor with a thrust direction at an angle to port from the longitudinal axis and a third buoy having a motor with a thrust direction at an angle to starboard from the longitudinal axis so that the first, second and third buoys together provide thrust in different directions that adjust the position of the plurality of carriers.

6. The system of claim 4, wherein each buoy further comprises a ducted propeller in a tunnel that is connected to a motor and one or more batteries in a watertight compartment that provide power to the motor and are charged by the solar energy device.

7. The system of claim 3, wherein the navigation system further comprises a buoy connected to the bow carrier and a buoy connected to the stern carrier, each buoy having a first motor having a thrust direction and a second motor having a different thrust direction that together provide thrust in different directions that adjust the position of the plurality of carriers.

8. The system of claim 7, wherein each buoy further comprises a ducted propeller in a tunnel that is connected to each motor and one or more batteries in a watertight compartment that provide power to the motors and are charged by the solar energy device.

9. The system of claim 1, wherein the processor is further configured to perform a linear quadratic estimation process to determine a navigation adjustment of the position of the plurality of carriers in the navigable waterway.

10. The system of claim 1, wherein the plurality of carriers are capable of navigating in fresh water, saline water or brackish water.

11. An asymmetric cargo transporting method, the method comprising:

providing a plurality of carriers connected to each other wherein each of the plurality of carriers floats and is capable of carrying a cargo downstream using a current of a navigable waterway;

loading cargo into each carrier of the plurality of carriers at a source of cargo on the navigable waterway;

floating downstream, by the plurality of carriers, on the current of the navigable waterway;

autonomously navigating the navigable waterway by adjusting a position of the plurality of carriers in the navigable waterway;

unloading the cargo from the plurality of carriers at a destination; and disassembling each carrier at the destination and returning the plurality of carriers to the source of the cargo.

12. The method of claim 11 further comprising generating, using a solar energy device connected to one or more of the carriers, electrical energy for a navigation system that autonomously navigating the navigable waterway.

13. The method of claim 11, wherein autonomously navigating the navigable waterway further comprises generating, using two or more buoys attached to each of a bow carrier and a stern carrier of the plurality of carriers, a thrust direction to adjust the position of the plurality of carriers in the navigable waterway.

14. The method of claim 13, wherein generating the thrust direction further comprises generating a thrust direction along a longitudinal axis of the convoy, generating a thrust direction at an angle to port from the longitudinal axis and generating a thrust direction at an angle to starboard from the longitudinal axis so that autonomously navigating the navigable waterway further comprises providing thrust in different thrust directions that adjust the position of the plurality of carriers.

15. The method of claim 11, wherein autonomously navigating the navigable waterway further comprises receiving information about the navigable waterway from a set of navigation sensors and performing machine learning navigation of the plurality of carriers in response to the gathered information about the navigable waterway and a set of stored information about the navigable waterway.

16. The method of claim 15, wherein performing machine learning navigation of the plurality of carriers further comprises performing a linear quadratic estimation process to determine a navigation adjustment of the position of the plurality of carriers in the navigable waterway.

17. The method of claim 11 further comprising reinflating, at the original of the cargo, each carrier before loading cargo onto the plurality of carriers.

18. The method of claim 17, wherein disassembling each carrier further comprises deflating each carrier after the cargo has been removed at the destination.

19. The method of claim 18 further comprising transporting the deflated carriers back to the source of the cargo and reinflating each carrier at the source of the cargo.

\* \* \* \* \*